United States Patent
Murari et al.

(10) Patent No.: US 7,208,339 B2
(45) Date of Patent: Apr. 24, 2007

(54) PROCESS FOR MANUFACTURING A MICROMACHINED OSCILLATING ELEMENT, IN PARTICULAR A MIRROR FOR OPTICAL SWITCHES

(75) Inventors: Bruno Murari, Monza (IT); Ubaldo Mastromatteo, Bareggio (IT); Paolo Ferrari, Gallarate (IT)

(73) Assignee: STMicroelectronics, S.r.l. (IT)

( * ) Notice: Subject to any disclaimer, the term of this patent is extended or adjusted under 35 U.S.C. 154(b) by 231 days.

(21) Appl. No.: 11/063,483

(22) Filed: Feb. 22, 2005

(65) Prior Publication Data

US 2005/0157372 A1    Jul. 21, 2005

Related U.S. Application Data

(62) Division of application No. 10/606,660, filed on Jun. 25, 2003, now Pat. No. 6,927,470.

(30) Foreign Application Priority Data

Jun. 28, 2002    (IT)    ............................ TO2002A0565

(51) Int. Cl.
*H01L 21/00* (2006.01)

(52) U.S. Cl. ............................ 438/52; 438/48; 438/118

(58) Field of Classification Search ................... 438/48, 438/52, 118; 257/432; 359/290
See application file for complete search history.

(56) References Cited

U.S. PATENT DOCUMENTS 6,091,537 A * 7/2000 Sun et al. .................... 359/248
6,330,102 B1   12/2001 Daneman et al.

\* cited by examiner

*Primary Examiner*—Andy Huynh
*Assistant Examiner*—Thinh T Nguyen
(74) *Attorney, Agent, or Firm*—Lisa K. Jorgenson; Graybeal Jackson Haley LLP; Paul F. Rusyn

(57) ABSTRACT

A micromachined device made of semiconductor material is formed by: a semiconductor body; an intermediate layer set on top of the semiconductor body; and a substrate, set on top of the intermediate layer. A cavity extends in the intermediate layer and is delimited laterally by bottom fixed regions, at the top by the substrate, and at the bottom by the semiconductor body. The bottom fixed regions form fixed electrodes, which extend in the intermediate layer towards the inside of the cavity. An oscillating element is formed in the substrate above the cavity and is separated from top fixed regions through trenches, which extend throughout the thickness of the substrate. The oscillating element is formed by an oscillating platform set above the cavity, and by mobile electrodes, which extend towards the top fixed regions in a staggered way with respect to the fixed electrodes. The fixed electrodes and mobile electrodes are thus comb-fingered in plan view but formed on different levels.

16 Claims, 6 Drawing Sheets

PROCESS FOR MANUFACTURING A MICROMACHINED OSCILLATING ELEMENT, IN PARTICULAR A MIRROR FOR OPTICAL SWITCHES

Priority Claim

The present application is a Divisional of U.S. patent application Ser. No. 10/606,660, filed on Jun. 25, 2003, which claims priority from Italian patent application No. TO2002A000565, filed Jun. 28, 2002, which is incorporated herein by reference.

This application is a division of Ser. No. 10/606,660 Jun. 25, 2003 U.S. Pat. No. 6,927,470.

TECHNICAL FIELD OF THE INVENTION

The present invention relates generally to a process for manufacturing a micromachined oscillating element, in particular a mirror for optical switches.

BACKGROUND OF THE INVENTION

As is known, in optical-fibre communication systems, in order to avoid conversion of optical signals into electronic signals and the subsequent conversion of electronic signals into optical signals, it is desirable to have miniaturized devices for addressing and switching optical signals. Advantageously, the addressing and switching devices must be activatable by electrical signals generated by electronics associated with the devices, which are preferably integrated.

To this aim, it has been proposed to manufacture small mobile reflecting surfaces (mirrors) employing micro-electromechanical-machining technologies used for microelectromechanical devices (MEMs). In particular, the mirrors may have just one degree of freedom (they are able to rotate about just one axis) for making two-dimensional switches, or two degrees of freedom (they are able to rotate about two axes) for making three-dimensional switches. Different processes have been proposed for making optical-switching devices of the type referred to above; however, these processes are rather complex and present some limitations.

For example, EP-A-1 180 848 describes a process for manufacturing a switch, wherein the rotation of a mirror element is obtained by converting a translational motion generated by a linear actuator through a conversion assembly or joint arranged between the mirror element and the actuator.

A further process, implemented by the present applicant, enables the manufacture of a mirror element formed by a reflecting platform and a plurality of fingers (mobile electrodes), which are biased at a potential with respect to fixed electrodes so as to cause an attraction between some of the fixed electrodes and the mobile electrodes and hence a rotation of the mirror element. According to this process, the fixed electrodes are formed in a first wafer, the mirror element with the mobile electrodes are formed in a second wafer, bonded to the first wafer and appropriately thinned, and the portion of the first wafer underneath the platform is removed from the back after bonding the second wafer to a third temporary handling wafer.

The above process is disadvantageous in that, in addition to being on the whole rather complex, it involves etching of the silicon of the first wafer throughout its thickness with the purpose of freeing the mirror element. In addition, it entails the formation of openings in the second wafer for accessing the first wafer and appropriately biasing the fixed electrodes. This is disadvantageous in that the contacts to the fixed electrodes are at a different level from the contacts to the mobile electrodes and to other possible structures, thus creating problems in the testing step. In addition, the first wafer is all at a same potential (the potential of the stator), and this may create problems after assembly on a board if there are leakages.

SUMMARY OF THE INVENTION

An embodiment of the present invention improves the foregoing procedures so as to overcome the disadvantages. According to this embodiment of the present invention there are provided a micromachined device and the relative manufacturing process.

BRIEF DESCRIPTION OF THE DRAWINGS

For an understanding of the present invention two preferred embodiments thereof are now described, purely by way of non-limiting example, with reference to the attached drawings, wherein.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
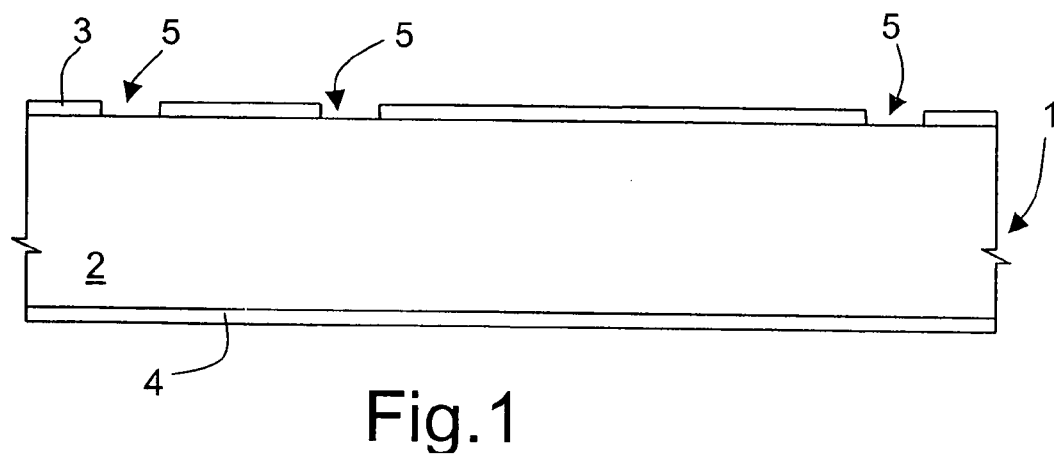
FIGS. 1–3 show a cross-section through a first wafer of semiconductor material, taken along line III—III of FIG. 4, in different fabrication steps.

According to FIG. 1, a first wafer 1 formed by a substrate 2 of monocrystalline semiconductor material (silicon) is subjected to oxidation, to form a first insulating layer 3 and a second insulating layer 4 of silicon dioxide, respectively on the front and on the rear of the wafer.

The first insulating layer 3 is then removed selectively to form contact openings 5 where the electrical contact is to be made between the substrate 2 and an intermediate layer, grown subsequently, as explained hereinafter. In particular, FIG. 1 shows three contact openings 5, at two stator regions and at an external region, as is better clarified hereinafter.

Figure 2:
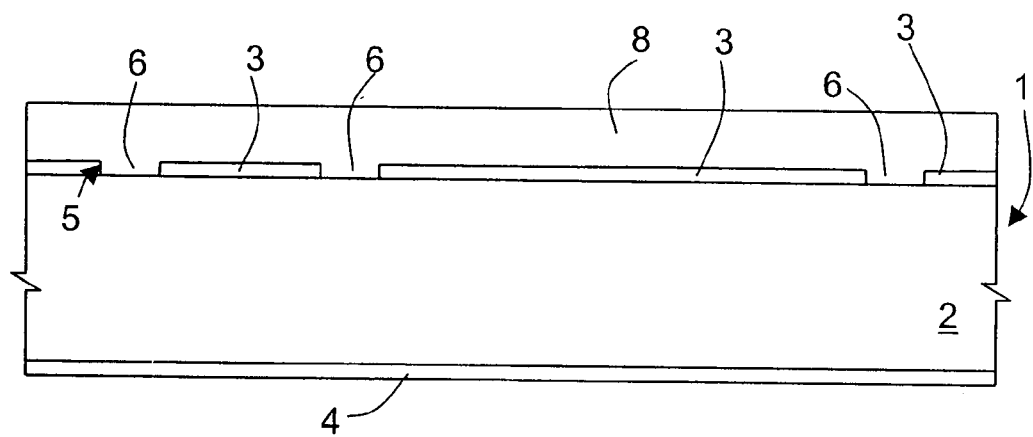

Subsequently, FIG. 2, on the front of the wafer 1, an intermediate layer 8 of polycrystalline silicon, obtained by deposition of an intermediate silicon layer or by deposition of a germ layer and subsequent epitaxial growth, is formed in a per se known manner. The intermediate layer 8 has, for example, a thickness of 50–100 μm and fills the contact openings 5 with contact portions 6, which thus electrically connect the intermediate layer 8 to the substrate 2. In a way not shown, on the back of the wafer 1 alignment marks are formed, necessary for the subsequent steps.

Figure 3:
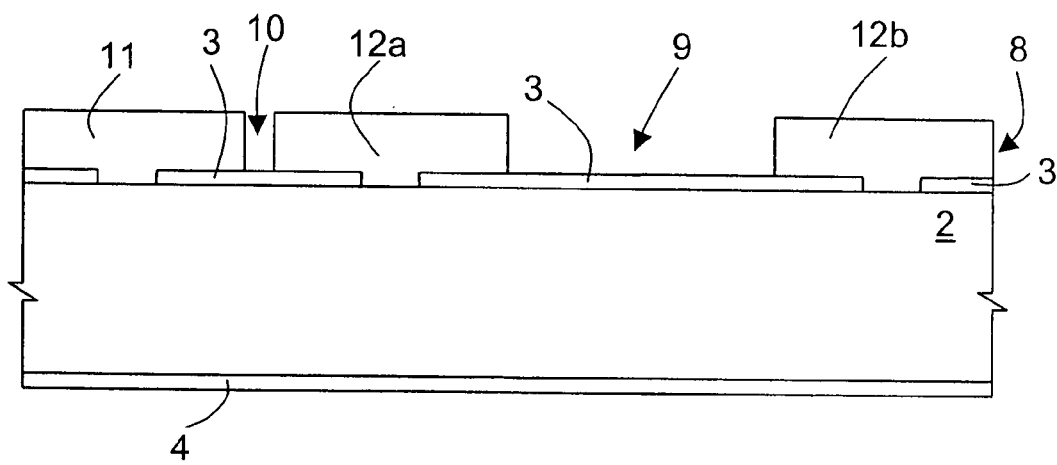
Figure 4:
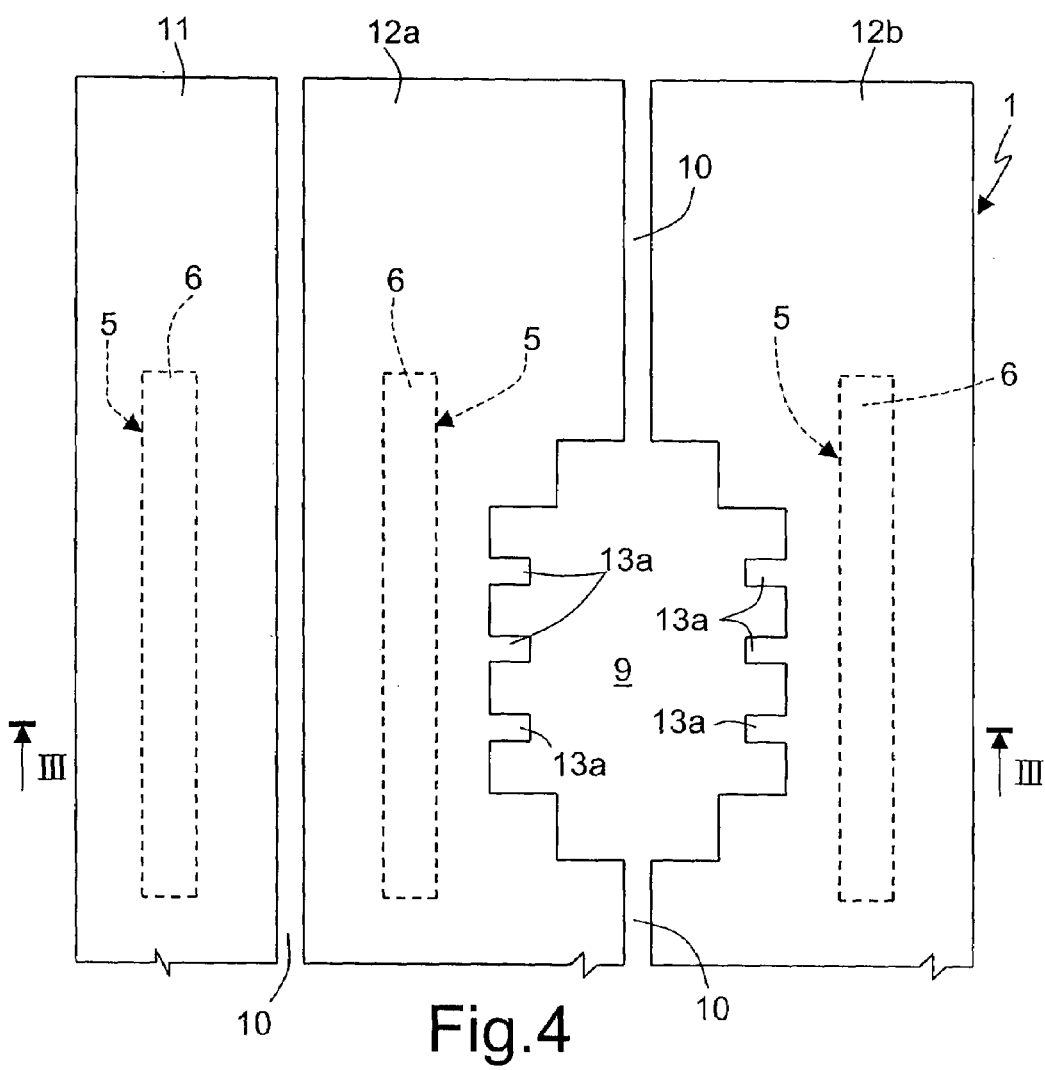
FIG. 4 is a top plan view of the wafer of FIG. 3.

After planarization through chemical-mechanical polishing (CMP), the wafer 1 is subjected (FIG. 3) to a masking and reactive ion etching (RIE) step, so as to form a cavity 9 and first electrical separation trenches 10. The shapes of the cavity 9 and of the first trenches 10 are shown in FIG. 4, which highlights with a dashed line also the shape of the contact portions 6. In this way, the intermediate layer 8 is here divided into a bottom outer region 11, a first bottom stator region 12a and a second bottom stator region 12b. Fixed electrodes 13a, 13b extend, respectively, from the first stator region 12a and from the second stator region 12b towards the inside of the cavity 9.

Figure 5:
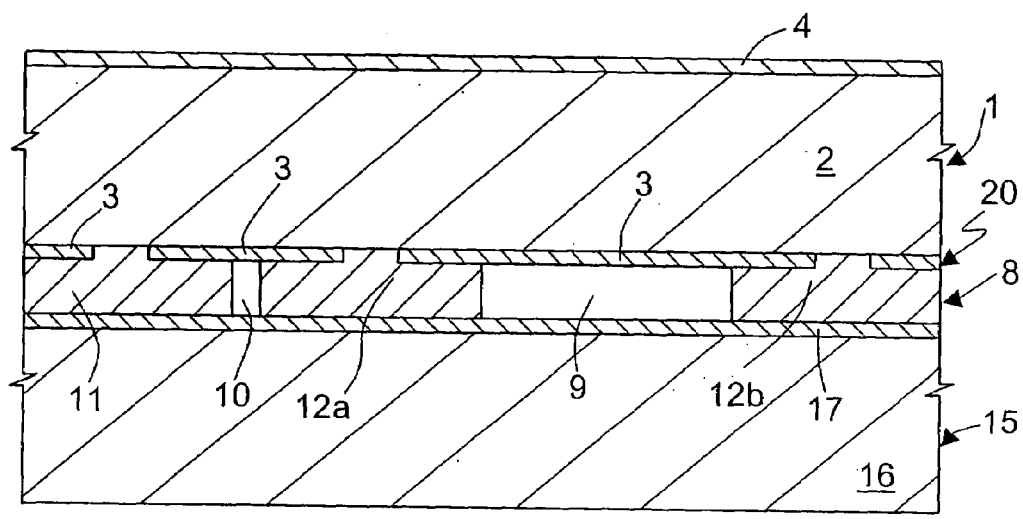
FIGS. 5–8 show a cross-section similar to that of FIGS. 1–3, after bonding the first wafer to a second wafer, in successive fabrication steps.

The first wafer 1 is turned upside down and bonded, in a per se known manner, to a second wafer 15 comprising a semiconductor body 16 and a bonding oxide layer 17, to obtain a composite wafer 20, as illustrated in FIG. 5.

Figure 6:
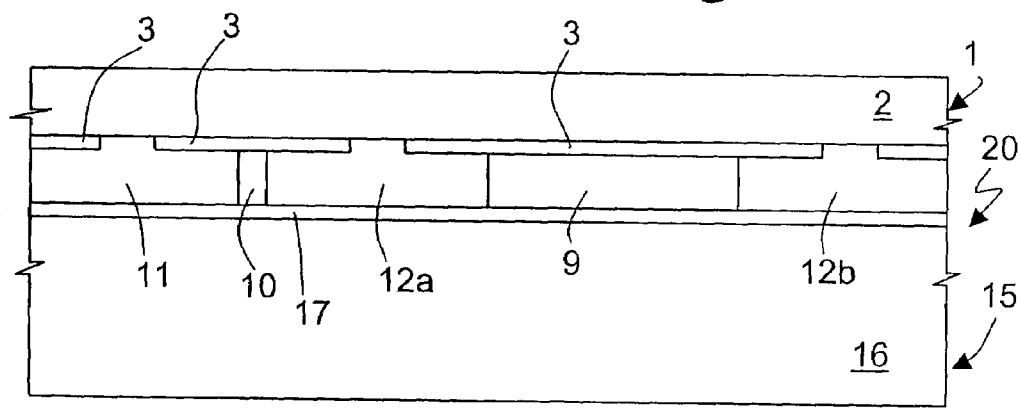

Hereinafter (FIG. 6), the first wafer 1 undergoes lapping and CMP so as to reduce the thickness of the substrate 2 to approximately 50–100 μm.

Figure 7:
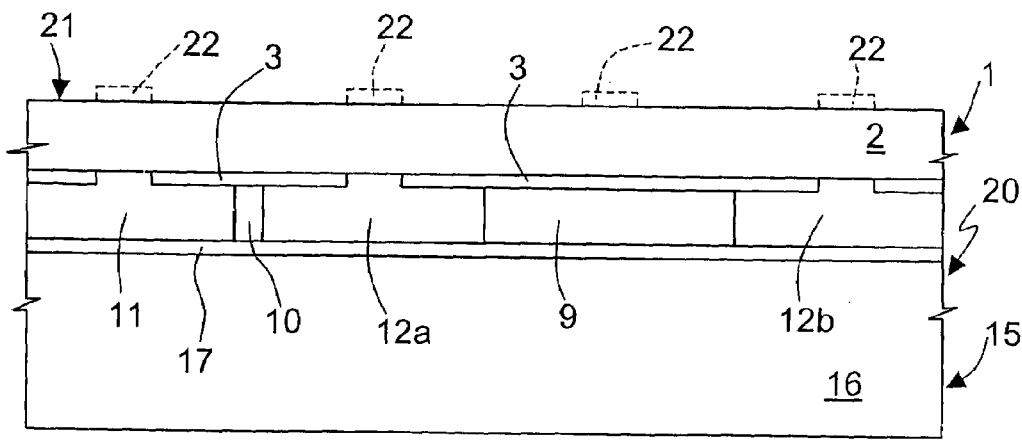

On the free surface 21 (FIG. 7), thus formed, of the first wafer 1 two metal layers, for example a first aluminium layer to form metallizations and a second chrome-gold layer to form a mirror surface (not shown), are then deposited and defined. In this way, metal contacts 22 (indicated with dashed lines in that they are arranged on a plane or planes different from the cross-sectional one) are formed, with the purpose of enabling biasing of the different portions of the finished device.

Figure 8:
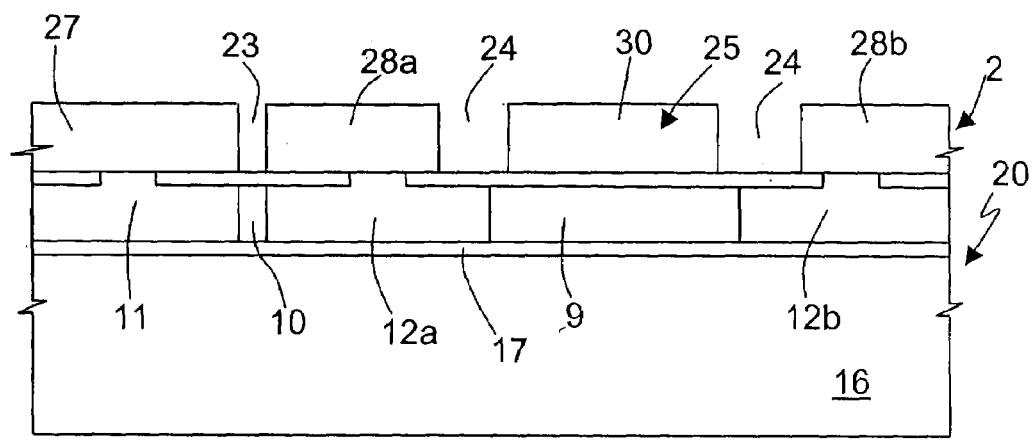
Figure 10:
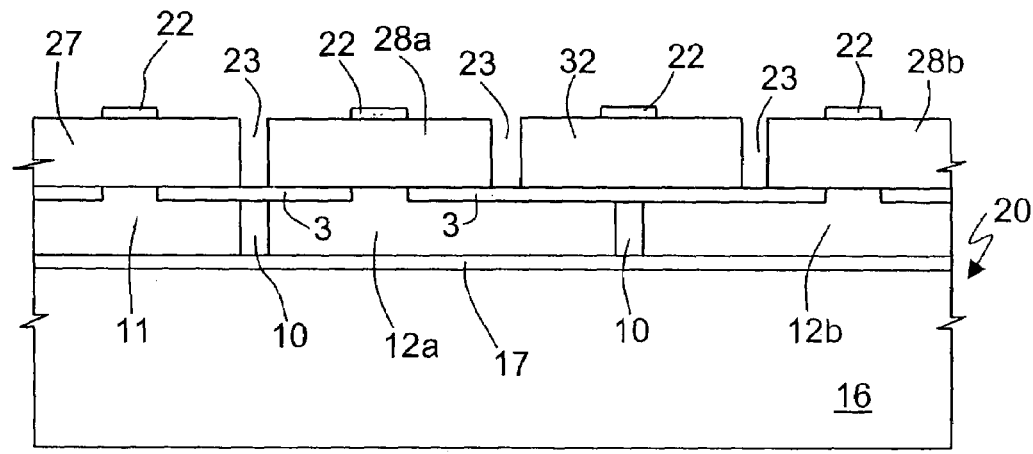
FIG. 10 is a cross-section of the composite wafer of FIG. 8, taken along the line X—X of FIG. 9.
Figure 9:
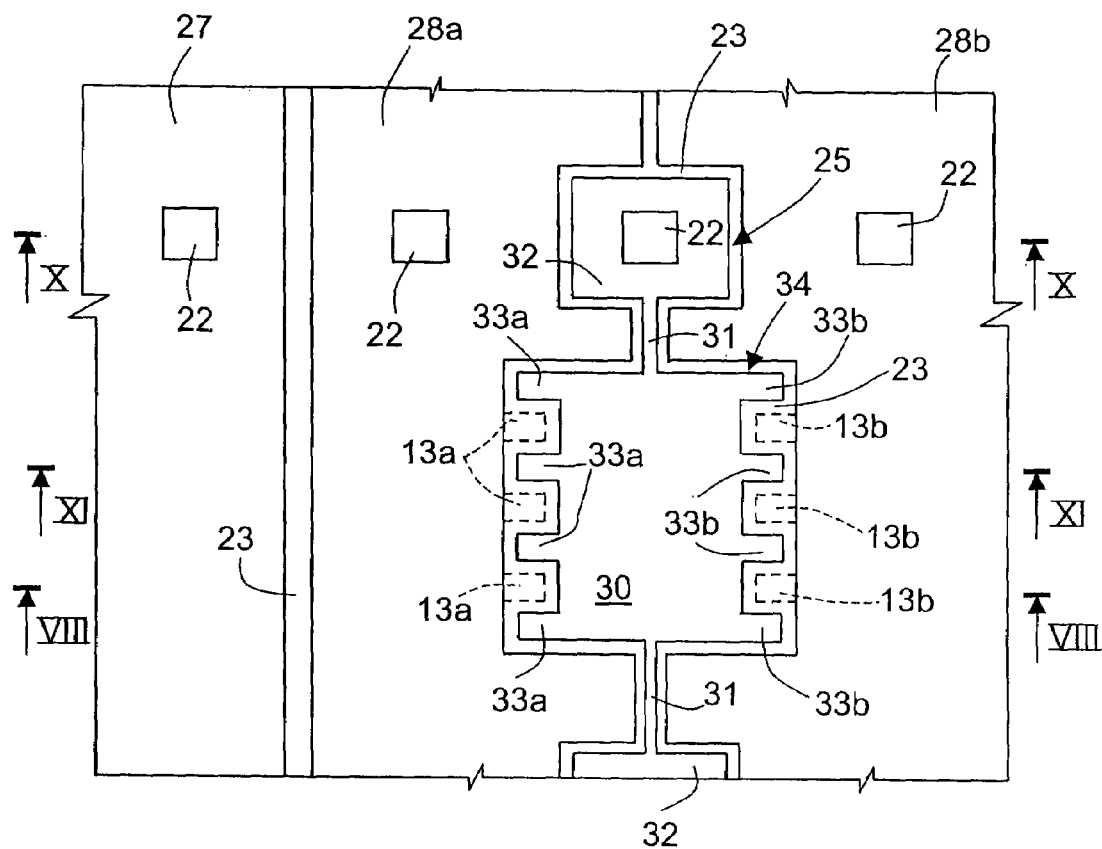
FIG. 9 is a top plan view of the composite wafer of FIG. 8.

Subsequently, in FIG. 8, the substrate 2 of the first wafer 1 is etched with a trench etch, which stops automatically on the first insulating layer 3. Second trenches 23, the shape whereof is shown in FIG. 9, are thus formed. The second trenches 23, which are in part aligned to the first trenches 10, separate from one another a mirror element 25, a top outer region 27, a top stator region 28a, and a second top stator region 28b. The mirror element 25 is formed by a platform 30, a pair of arms or supporting springs 31, anchoring regions 32, and mobile electrodes 33a, 33b; the platform 30, the supporting arms 31, and the mobile electrodes 33a, 33b extending above the cavity 9 and forming an oscillating element 34. The oscillating platform 30 forms a reflecting surface used for switching an optical beam. A metal contact 22 is present on at least one of the anchoring regions 32, as may be seen also from FIG. 10. In the example illustrated, the mobile electrodes 33a, 33b extend directly from the platform 30 toward the top stator regions 28a, 28b in a staggered way with respect to the fixed electrodes 13a, 13b and, precisely, comb-fingered with respect to the latter in top plan view, even though they are formed on different planes.

Finally, portions of the first insulating layer 3 are removed through the second trenches 23 by an RIE etch. In practice, the first insulating layer 3 is removed underneath the oscillating element 34, where the cavity 9 is present, so as to free the platform 30, the mobile electrodes 33a, 33b, and the supporting arms 31, as illustrated in the FIG. 11, which shows a cross-section taken on a plane different from that of the previous figures, and indicated by XI—XI in FIG. 9. In addition, the first insulating layer 23 is removed between the top outer region 27 and the first and second top stator regions 28a, 28b, separating completely said regions from one another.

Figure 12:
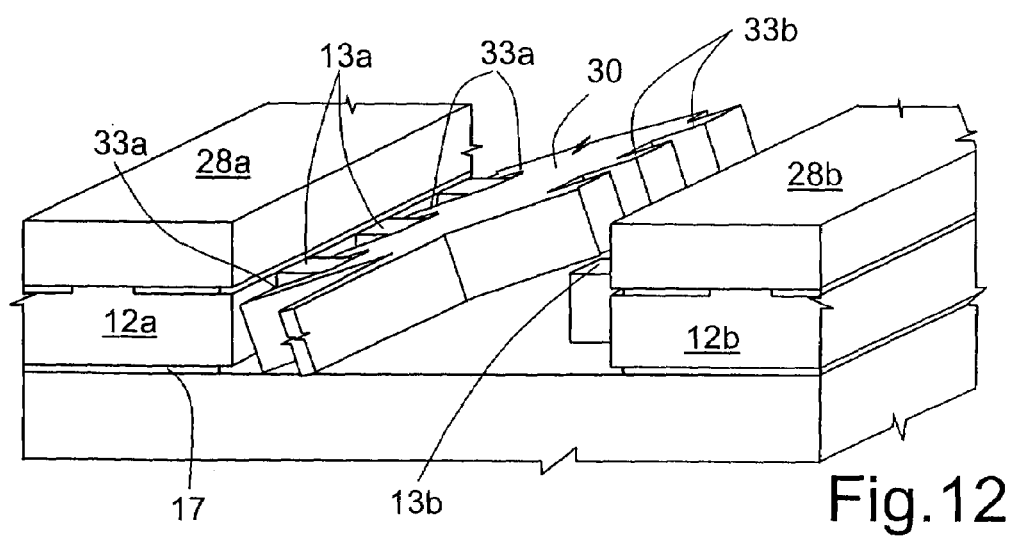
FIG. 12 is a perspective view of the mirror element of FIG. 11.
Figure 11:
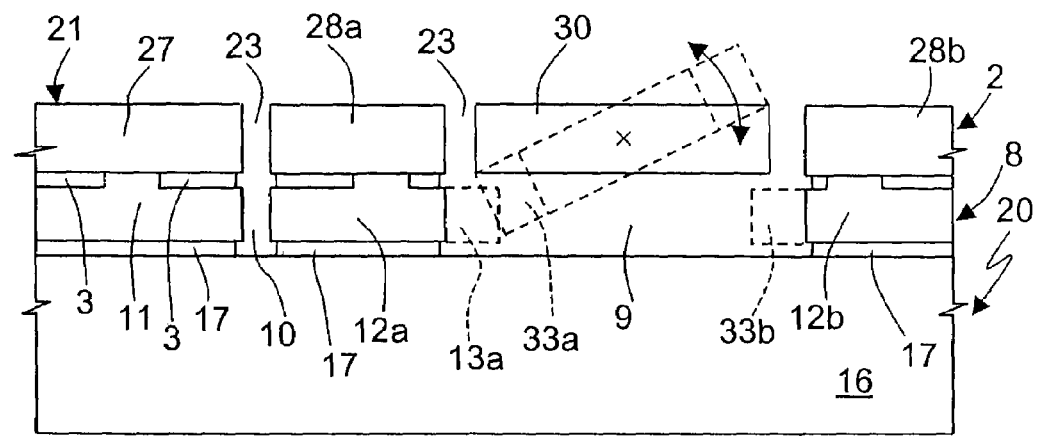
FIG. 11 shows a cross-section of the oscillating mirror element, taken along line XI—XI of FIG. 9, in a final fabrication step.

Thus the final structure of FIGS. 11 and 12 is obtained. In particular, in FIG. 11, the mirror element 25 is represented with a solid line in the resting position, with the platform 30 coplanar to the top stator regions 28a, 28b, and with a dashed line in the inclined position. The inclined position shown in FIGS. 11 and 12 is obtained by appropriately biasing the top stator regions 28a, 28b and the anchoring region 32 (through the metal contacts 22) so as to create an attractive force between the fixed electrodes 13a and the mobile electrodes 33a.

Figure 13:
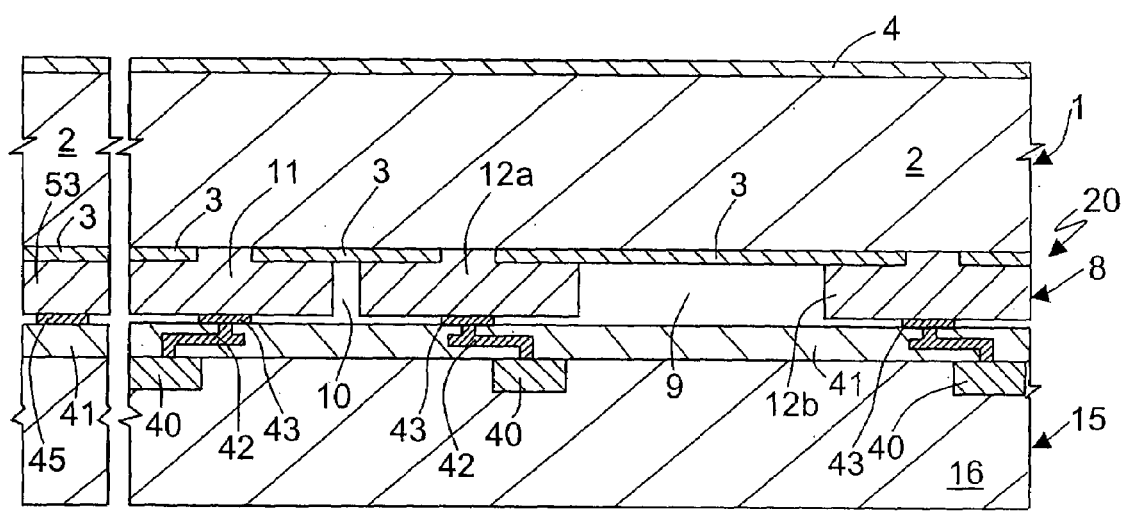
FIG. 13 illustrates a variant of FIG. 5.

According to a different embodiment of the process, the second wafer 15 houses the electrical components necessary for controlling the position of the platform 30. To this aim, the bonding between the first wafer 1 and the second wafer 15 must enable electrical connection between the bottom outer region 11 and the bottom stator regions 12a, 12b, and the relative components in the second wafer 15. In detail, as illustrated in FIG. 13 and in a per se known manner, the second wafer 15 is machined so as to integrate the electronic components, represented in FIG. 13 by conductive regions 40 having a conductivity opposite to the substrate 16. An oxide layer 41 is formed on top of the upper surface of the substrate 16, electrical-connection regions 42 of metal are formed inside the oxide layer 41, and pads 43, for example of palladium, are formed above the oxide layer 41, in regions 11, 12a, 12b of the first wafer 1. In addition, as shown in the portion to the left in FIG. 13, bonding regions 45 are formed, simultaneously to the pads 43, where a mechanical connection is desired between the second wafer 15 and the first wafer 1.

Figure 14:
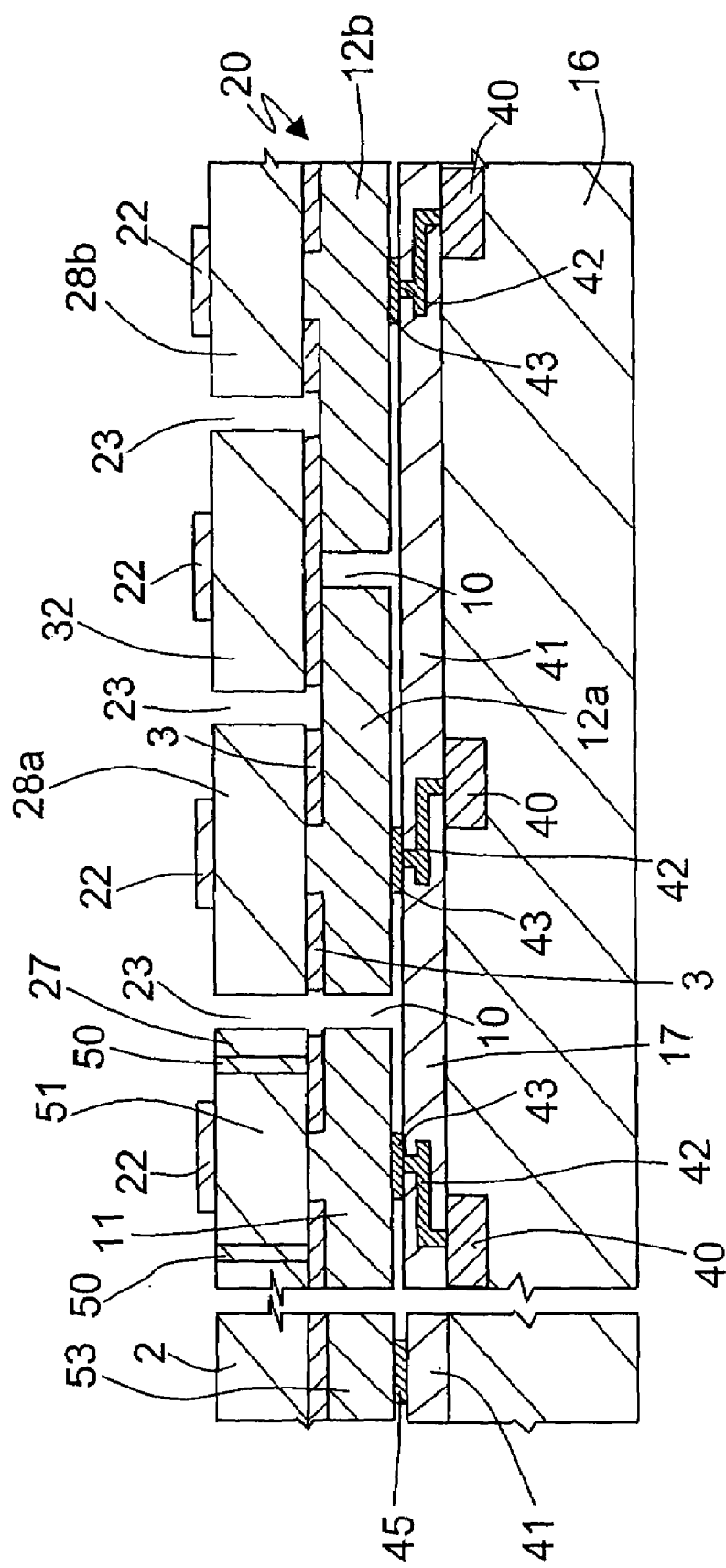
FIG. 14 is a cross-section of the variant of FIG. 13, in a final fabrication step.

Then, similar to what was described with reference to FIG. 5, the first wafer 1 is turned upside down and bonded to the second wafer 15. In particular, where the pads 43 and the bonding regions 45 are present, they form a bond with the silicon of the intermediate layer 8, electrically connecting the regions 11, 12a, 12b to the conductive regions 40 through the electrical-connection regions 42. In the bonding regions 45 there is, instead, a pure mechanical bonding. In addition, as may be noted in FIGS. 13 and 14, above the bonding regions 45 the first insulating layer 3 is continuous, insulating the portion 53 of the intermediate layer from the substrate 2. Then, the process proceeds with steps similar to the ones described with reference to FIGS. 6–12, except for that, when the second trenches 23 are made, circular openings are also formed around the pads 22 used for contacting the electronic components (conductive regions 40), and then these circular openings are filled with dielectric material 50 so as to insulate silicon plugs 51 from the rest of the substrate 2, as shown in FIG. 14.

The advantages of the described process and device are indicated hereinafter. First, the process is simple and involves the bonding of just two wafers to obtain the mirror element.

All the regions are electrically insulated from one another; in particular, the anchoring regions 32 of the mirror element 25 are insulated from the underlying regions by an oxide layer (first insulating layer 3) and the outer region 11, 27, the first stator region 12a, 28a, and the second stator region 12b, 28b are insulated from one another and with respect to the second wafer 15. This also enables integration of electronic components in the substrate 2, which is monocrystalline.

All the contacts are arranged at the same level, on the surface 21 of the substrate 2; consequently, the operations of contacting and testing are facilitated and it is possible to test the mirror element 25 in an electrical wafer sorting (EWS) step.

Freeing of the oscillating element 34 is obtained without the need to remove the underlying substrate from the backside; consequently, the procedure is simpler and more economical, and the final structure is sturdier.

The embodiments of micromachined devices described above with reference to FIGS. 1–14 may be incorporated into an integrated circuit, which may, in turn, be incorporated into an electronic system, such as an optical communications system.

Finally, it is clear that numerous modifications and variations can be made to the process and device described and illustrated herein, all of which fall within the scope of the invention, as defined in the attached claims.

What is claimed is:

1. A process for manufacturing a micromachined device, characterized by the steps of:

forming a cavity in an intermediate layer arranged on top of a substrate, said cavity being delimited at the bottom by said substrate and laterally by bottom fixed regions that are formed in said intermediate layer and defining fixed electrodes and extending towards the inside of said cavity;

putting said intermediate layer on a semiconductor body, thereby closing said cavity;

forming trenches in said substrate so as to define an oscillating element above said cavity and to separate said oscillating element from top fixed regions, said oscillating element having mobile electrodes extending towards said top fixed regions in a staggered way with respect to said fixed electrodes.

2. The process according to claim 1, wherein said step of forming a cavity comprises: forming said intermediate layer on top of said substrate by growth or deposition of semiconductor material; and removing selectively said intermediate layer for forming said cavity.

3. The process according to claim 2, wherein said step of removing selectively said intermediate layer further comprises digging said intermediate layer for reciprocally insulating said bottom fixed regions.

4. The process according to claim 1, wherein before forming said intermediate layer, the following steps are carried out:

forming a first insulating layer on top of said substrate; and forming openings in said first insulating layer;

and wherein said step of forming said intermediate layer comprises forming contact portions extending inside said openings and in direct electrical contact with said substrate.

5. The process according to claim 4, wherein, after said step of forming trenches, the step of removing said first insulating layer underneath said oscillating element is performed.

6. The process according to claim 1, wherein said step of putting said intermediate layer comprises the steps of:

bonding said intermediate layer to said semiconductor body; and thinning said substrate.

7. The process according to claim 6, wherein said step of bonding comprises forming a bonding structure on top of said semiconductor body and fixing said intermediate layer to said semiconductor body through said bonding structure.

8. The process according to claim 7, wherein said bonding structure comprises an insulating layer on top of said semiconductor body.

9. The process according to claim 7, comprising, before said step of forming a bonding structure, the steps of forming electronic components in said semiconductor body, forming an insulating layer on top of said semiconductor body, forming electrical-connection regions in said insulating layer, said bonding structure comprising pads connected electrically to said electrical-connection regions, said step of bonding comprising bonding said pads to at least said bottom fixed regions.

10. The process according to claim 6, wherein, after said step of thinning, metal regions are formed on top of said substrate.

11. The process according to claim 1, wherein said step of forming trenches further comprises removing selective portions of said substrate to form mutually insulated top regions.

12. A method of forming a micromachined device, comprising:

forming an intermediate layer on a first substrate;

forming a cavity in the intermediate layer;

bonding a removable surface of a second substrate to the intermediate layer;

forming in the second substrate a movable element adjacent the cavity; and removing through the second substrate a portion of the removable surface adjacent the cavity to allow the movable element to move.

13. The method of claim 12 wherein removing through the second substrate a portion of the removable surface comprises:

removing a portion of the second substrate;

forming trenches in the second substrate; and removing the portion of the removable surface through the trenches.

14. The method of claim 13 wherein removing the portion of the removable surface through the trenches comprises performing reactive ion etching.

15. The method of claim 12 further comprising forming first and second fixed control regions in the intermediate layer, the first and second fixed control regions being spaced apart to define the cavity between the control regions.

16. The method of claim 12 further comprising forming third and fourth fixed control regions in the second substrate separate from the movable element.

* * * * *